(12) United States Patent
Liu et al.

(10) Patent No.: US 11,904,643 B2
(45) Date of Patent: Feb. 20, 2024

(54) HIGH-PRECISION INTELLIGENT CENTERING DEVICE

(71) Applicant: CITIC DICASTAL CO., LTD., Hebei Province (CN)

(72) Inventors: Weidong Liu, Hebei Province (CN); Shiwen Xu, Hebei Province (CN); Zuo Xu, Hebei Province (CN); Minglei Li, Hebei Province (CN); Lisheng Wang, Hebei Province (CN)

(73) Assignee: CITIC Dicastal Co., Ltd., Qinhuangdao (CN)

(*) Notice: Subject to any disclaimer, the term of this patent is extended or adjusted under 35 U.S.C. 154(b) by 379 days.

(21) Appl. No.: 17/408,163

(22) Filed: Aug. 20, 2021

(65) Prior Publication Data
US 2022/0395952 A1    Dec. 15, 2022

(30) Foreign Application Priority Data
Jun. 10, 2021 (CN) .......................... 202121293662.4

(51) Int. Cl.
*B60C 25/05* (2006.01)

(52) U.S. Cl.
CPC .............................. *B60C 25/0542* (2013.01)

(58) Field of Classification Search
CPC .................................................. B60C 25/0542
USPC ..................................................... 33/203, 644
See application file for complete search history.

(56) References Cited

U.S. PATENT DOCUMENTS

| | | | | |
|---|---|---|---|---|
| 4,823,470 A * | 4/1989 | Horvallius | ........... | G01B 11/275 33/228 |
| 5,048,192 A * | 9/1991 | Pascoal | .................. | G01B 5/255 33/203.18 |
| 6,131,293 A * | 10/2000 | Maioli | .................... | G01B 5/255 33/203.18 |
| 6,634,114 B2 * | 10/2003 | Bidwell | ................. | G01B 5/201 33/549 |
| 10,926,371 B2 * | 2/2021 | Xu | ........................ | B24B 21/008 |
| 11,181,355 B2 * | 11/2021 | Xu | ........................ | B60T 17/221 |
| 11,219,915 B2 * | 1/2022 | Xu | ........................ | B05C 13/02 |
| 11,370,136 B2 * | 6/2022 | Liu | ............................ | B25B 1/18 |
| 2020/0406679 A1 * | 12/2020 | Liu | .......................... | G01B 5/20 |

* cited by examiner

*Primary Examiner* — George B Bennett
(74) *Attorney, Agent, or Firm* — IPro, PLLC

(57) ABSTRACT

A high-precision intelligent centering device, consisting of a symmetrical synchronous centering mechanism. The invention can meet the needs of wheel centering in use with the ideal effect and high efficiency. Work is safe and reliable, degree of automation is high, and it is especially suitable for mass production on the production line.

1 Claim, 1 Drawing Sheet

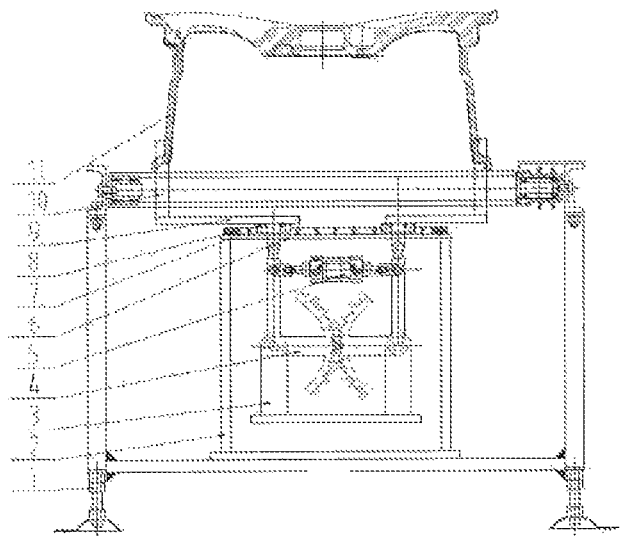

HIGH-PRECISION INTELLIGENT CENTERING DEVICE

This patent application claims the benefit of Chinese Patent Application with Ser. No. 2021212936624 filed on Jun. 10, 2021, which is incorporated by reference herein.

TECHNICAL FIELD

The invention relates to a centering device, specifically, a device that achieves high-precision centering of wheels by means of special synchronizing gear meshing.

BACKGROUND TECHNOLOGY

In the automotive wheel processing industry, the increasing labor costs promotes the industry's degree of automation, but automation needs high-precision positioning, so improving the positioning accuracy of wheels is a problem which must be solved by wheel processing enterprises.

SUMMARY OF THE INVENTION

The purpose of the invention is to provide a high-precision intelligent centering device.

In order to achieve the above purposes, the technical scheme of the present invention is: a high-precision intelligent centering device, consisting of a left and right symmetrical synchronous centering mechanism, including a rack, support, base, gear arm, two-way cylinder, base plate, linear guide rail, guide rail slide, connecting plate and positioning rod. The base plate is mounted on the rack by support; the connecting plate is connected to the linear guide rail through the guide rail slide, the four positioning rods are symmetrically fixed to the connecting plate, the gear arm and the base are hinged, the other end is hinged with the connecting plate, the gears of the left and right gear arms are partly engaged, two-way cylinder is placed into two output shafts respectively for connection with the left and right gear arms.

In the preference aspect of the invention, the gear parts of the left and right gear arms are partly engaged with high precision, and the structure can adjust the synchronization performance of the left and right centering mechanism with high precision.

In the preference aspect of the invention, in the process of synchronous clamping of the device, after aeration of two-way cylinder, the left and right gear arms are driven to expand towards two sides, through partly high-precision meshing of the gears of the left and right gear arms, it realizes high-precision synchronous centripetal motion of the four positioning rods distributed evenly on the left and right sides along the linear guide rail, and completes high-precision wheel centering.

In practice, the wheel moves to the device clamping position through the roller conveyor system, and then, the two-way cylinder begins to work, driving the upper part of the left and right gear arms to open towards both sides, through partly high-precision meshing of gears of the left and right gear arms, it finally realizes high-precision synchronous centripetal motion of positioning rods on the left and right sides, and completes the wheel high-precision synchronous centering work.

The invention can meet the needs of high precision centering of wheels in use, and the effect is ideal and efficient. The work is safe and reliable, with a high degree of automation, making it particularly suitable for mass production on the production line.

BRIEF DESCRIPTION OF THE DRAWINGS

FIG. 1 is a structural diagram of a high-precision intelligent centering device of the invention.

In the FIGURE, 1—rack, 2—support, 3—base, 4—gear arm, 5—two-way cylinder, 6—base plate, 7—linear guide rail, 8—guide rail slide, 9—connecting plate, 10—positioning rod, 11—wheels.

DESCRIPTION OF THE EMBODIMENTS

The details and working conditions of the specific device proposed as per the invention are explained below in details in combination with the drawings.

The invention proposes a high-precision intelligent centering device which consists of a symmetrical synchronous centering mechanism, including rack 1, support 2, base 3, gear arm 4, two-way cylinder 5, base plate 6, linear guide rail 7, guide rail slide 8, connecting plate 9 and positioning rod 10. The base plate 6 is mounted on rack 1 by support 2; the connecting plate 9 is connected to the linear rail 7 via rail slide 8, the four positioning rods 10 are symmetrically fixed to the connecting plate 10 respectively; the gear arm 4 is hinged to the base 3, the other end is hinged with the connection plate 9, the gears of the left and right gear arms 4 are partly engaged, and two-way cylinder is placed into two output shafts respectively for connection with left and right gear arms 4.

In the preference aspect of the invention, the gears of the left and right gear arms 4 are partly engaged with high precision and the structure can adjust the synchronization performance of the left and right centering mechanism with high precision.

In the preference aspect of the invention, in the process of synchronous clamping of the device, after aeration of two-way cylinder 2, the left and right gear arms 4 are driven to expand towards two sides, through partly high-precision meshing of the gears of the left and right gear arms 4, it realizes high-precision synchronous centripetal motion of the four positioning rods 10 distributed evenly on the left and right sides along the linear guide rail 7, and completes high-precision wheel centering.

In practice, the wheel 11 moves to the device clamping position through the roller conveyor system, and then, the two-way cylinder 5 begins to work, driving the upper part of the left and right gear arms 4 to open towards both sides, through partly high-precision meshing of gears of the left and right gear arms 4, it finally realizes synchronous centripetal motion of positioning rods 10 on the left and right sides along linear guiding rail 7, and completes the high-precision synchronous centering work of wheel 11.

We claim:

1. A high-precision intelligent centering device, including rack, support, base, gear arm, two-way cylinder, base plate, linear guide rail, guide rail slide, connecting plate, and positioning lever, characterized in that: the base plate is mounted on the rack by support; the connecting plate is connected to the linear guide rail by the guide rail slide and the four positioning rods are symmetrically fixed on the connecting plate; the gear arm is hinged with the base, the other end is hinged with the connecting plate, the gears of the left and right gear arms are partly engaged, and the two-way cylinder is placed into the two output shafts respectively for connection with left and right gear arms.

\* \* \* \* \*